(12) United States Patent
Yoshida (10) Patent No.: US 8,113,519 B2
(45) Date of Patent: Feb. 14, 2012

(54) PACKING MATERIAL FITTING STRUCTURE

(75) Inventor: Haruyoshi Yoshida, Gunma-ken (JP)

(73) Assignee: Yamada Manufacturing Co., Ltd., Gunma-ken (JP)

( * ) Notice: Subject to any disclaimer, the term of this patent is extended or adjusted under 35 U.S.C. 154(b) by 381 days.

(21) Appl. No.: 12/379,102

(22) Filed: Feb. 12, 2009

(65) Prior Publication Data

US 2009/0243229 A1 Oct. 1, 2009

(30) Foreign Application Priority Data

Apr. 1, 2008 (JP) ................................. 2008-095577

(51) Int. Cl.
*F16J 15/10* (2006.01)
*F02F 11/00* (2006.01)

(52) U.S. Cl. ........................................ 277/637; 277/598

(58) Field of Classification Search .................. 277/640, 277/637, 630, 616, 598, 591
See application file for complete search history.

(56) References Cited

U.S. PATENT DOCUMENTS

| | | | | |
|---|---|---|---|---|
| 3,625,527 | A * | 12/1971 | Brindle | 277/591 |
| 4,377,204 | A * | 3/1983 | Johansson | 165/166 |
| 4,995,455 | A * | 2/1991 | Mathur | 165/166 |
| 6,257,592 | B1 * | 7/2001 | Hashizawa et al. | 277/596 |
| 6,588,762 | B2 * | 7/2003 | Boone et al. | 277/312 |
| 6,761,360 | B2 * | 7/2004 | Hammi | 277/630 |
| 7,029,013 | B2 * | 4/2006 | Yajima et al. | 277/637 |
| 2004/0108661 | A1 * | 6/2004 | Stefansson | 277/641 |
| 2007/0246896 | A1 | 10/2007 | Matsuki | |
| 2010/0066033 | A1 * | 3/2010 | Jessberger et al. | 277/591 |

FOREIGN PATENT DOCUMENTS

| | | |
|---|---|---|
| JP | 10-9395 | 1/1998 |
| JP | 2905124 | 3/1999 |
| JP | 2000-161496 | 6/2000 |
| JP | 2005-233315 | 9/2005 |
| JP | 2005-240988 | 9/2005 |

OTHER PUBLICATIONS

European Search Report dated Aug. 5, 2009.

* cited by examiner

*Primary Examiner* — Thomas Beach
*Assistant Examiner* — Kelly Shaw
(74) *Attorney, Agent, or Firm* — McGinn Intellectual Property Law Group, PLLC (57) ABSTRACT

A packing material fitting structure that prevents the packing material from easily dropping out and facilitates mounting and fixing of the packing material in a packing material fitting place in a part such as a casing or a cover of an engine or a pump with sealing ability. The fitting structure is provided with a packing material having an annular main body portion and a plurality of projections each having a main protruding portion formed to protrude from the annular main body portion and an auxiliary protruding portion formed integrally in the vicinity of the main protruding portion, the projections being formed with an appropriate spacing in the longitudinal direction of the main annular main body portion. The fitting structure is also provided with a casing having formed therein an annular fitting groove for inserting the annular main body portion of the packing material. A cutout portion into which only the main protruding portion of the projection is inserted is formed in a groove wall portion of the fitting groove. An integral forming region of the auxiliary protruding portion and the annular main body portion has a width substantially equal to or larger than a width of the fitting groove. In the packing material, a projection formation location is pressed and fixed only by the cutout portion and both groove wall portions in the vicinity of the cutout portion.

2 Claims, 6 Drawing Sheets

PACKING MATERIAL FITTING STRUCTURE

BACKGROUND OF THE INVENTION

1. Field of the Invention

The present invention relates to a packing material fitting structure such that the packing material can be prevented from easily separating or dropping out of a fitting groove in a packing material fitting place in a part such as a casing or a cover of an engine or a pump with sealing property, the packing material can be easily mounted and fixed, and the sealing ability in the packing material fixing place can be prevented from decreasing.

2. Description of the Related Art

Packing materials have been widely used in portions requiring sealing ability in parts such as casings and covers of engines, pumps, and the like. An annular (loop-shaped) groove is formed in a joining surface to mount the packing material between the joining surfaces of structural members such as casings and covers, and a packing material of a similar annular shape is mounted along the longitudinal direction of the fitting groove. In most cases, once a predetermined assembling operation of this part is completed, the part is transported to another site and mounted on a large structural object such as an engine.

A problem arising in this case is that during handing and transportation to another assembling site or the like, and before mounting on a structural object etc., the packing material can drop out of the structural member and be lost or the packing material can separate in the assembling operation, thereby decreasing operation efficiency. In order to prevent the packing material from easily separating and dropping out of the fitting groove of the casing, protrusions have been formed with an appropriate spacing in the longitudinal direction of the packing material to maintain the mounted state thereof. These protrusions are caught in the fitting groove and prevent the packing material from separating and dropping out of the fitting groove of the casing during the assembling operation or during transportation.

As a means for resolving the above-described problems, protrusions have been formed in several locations on the inner wall of the fitting groove and the packing material has been pushed against and fixed to the opposing inner wall with the protrusions, thereby preventing the packing material from dropping out. However, a variety of problems arise when the protrusions are formed without forethought at the inner wall of the fitting groove. For example, where the protrusions are small, a fixing force sufficient to fix the packing material inside the fitting groove cannot be obtained and the packing material drops out easily from the fitting groove.

Where the protrusions are large, a pressing force that fixes the packing material increases and a sufficient force for fixing the packing material can be obtained. However, in this case, the cross section of packing material deforms in the protrusion formation places, torsion occurs in the packing material, and the packing material can rise. Where the packing material in this state is fitted in another structural body, the packing material projects from the fitting groove, the projecting portion is cut into and crushed in the joining surface place of the other part, and sealing capacity of the packing material is degraded. A structure resolving the above-described problems is disclosed in Japanese Patent Application Laid-open No. 2005-233315.

The invention disclosed in Japanese Patent Application Laid-open No. 2005-233315 can resolve most of the conventional problems, but there is still space for improvement. First, when a casing is mounted on a cover or another device and an assembled state is produced, there is a risk of the packing material projecting from the inner side (or outer side) in the transverse direction of the fitting groove to the outside of the fitting groove. As a result, the degree of freedom in designing a pump space and, therefore, the degree of freedom in designing a casing shape can be restricted. Furthermore, because the packing material is fixed to the fitting groove by fitting the projection of the packing material into the cutout portion, a large tightening force is required, in particular to attain strong fitting of the projection and the cutout portion, and a large load is placed on a worker.

SUMMARY OF THE INVENTION

Furthermore, it is difficult to verify whether the projection has been reliably and accurately inserted into the cutout portion. Moreover, when the casing is formed by casting, the fitting groove is usually provided with a draft angle such that the distance between both wall surfaces gradually increases from the bottom portion of the fitting groove to the surface thereof. Because the packing material is fixed to the fitting groove only by the projection and the cutout portion of the fitting groove, the annular portion easily rises from the fitting groove where the draft angle is present. It is an object (technical task) of the present invention to make it possible to mount a packing material very easily on a fitting groove of a casing, to make this mounting strong, and to attain a state in which it would be difficult for the packing material to separate from the casing during transportation thereof as a part.

Accordingly, the inventors have conducted a comprehensive research aimed at the resolution of the above-described problems. The results obtained demonstrated that in accordance with first aspect of the invention, the above-described problems are resolved by a packing material fitting structure comprising: a packing material having an annular main body portion and a plurality of projections each comprising a main protruding portion formed to protrude from the annular main body portion and an auxiliary protruding portion formed integrally in the vicinity of the main protruding portion, the projections being formed with an appropriate spacing in the longitudinal direction of the annular main body portion; and a casing having formed therein an annular fitting groove for inserting therein the annular main body portion of the packing material, wherein a cutout portion into which only the main protruding portion of the projection is inserted is formed in a groove wall portion of the fitting groove, an integral forming region of the auxiliary protruding portion and the annular main body portion has a width substantially equal to or larger than a width of the fitting groove, and in the packing material, a projection formation location is pressed and fixed only by the cutout portion and two groove wall portions in the vicinity of the cutout portion.

In accordance with second aspect of the invention, the above-described problems are resolved by the above-described configuration, wherein the auxiliary protruding portion of the projection is formed on both sides, in the longitudinal direction, of the main protruding portion. In accordance with third aspect of the invention, the above-described problems are resolved by the above-described configuration, wherein a thickness of the auxiliary protruding portion is formed to be smaller than a thickness of the main protruding portion.

In accordance with forth aspect of the invention, the above-described problems are resolved by the above-described configuration, wherein a position of a lower surface side of the auxiliary protruding portion substantially coincides with a lower end of the annular main body portion in a diametrical direction. In accordance with fifth aspect of the invention, the above-described problems are resolved by the above-described configuration, wherein a front surface of the auxiliary protruding portion is formed to incline so as to approach the annular main body side from an upper surface toward a lower surface.

In accordance with first aspect of the invention, the main protruding portion of the projection is inserted into the cutout portion, the auxiliary protruding portion and the annular main body portion are inserted into the fitting groove where the cutout portion is formed, and the packing material is fixed to the fitting groove by the main protruding portion and auxiliary protruding portion. Furthermore, outside the projection location, the diameter of the annular main portion has a margin with respect to the width of the fitting groove and the annular main portion does not protrude to the inner circumferential side of the fitting groove. Therefore, the shape of the fitting groove places no limitation on the shape of the entire casing, and a sufficient degree of freedom in designing the casing shape can be ensured. Furthermore, the projection comprises the main protruding portion that is formed to protrude from the annular main body portion and an auxiliary protruding portion that is formed integrally in the vicinity of the main protruding portion, and by apply an external force so as to press the main protruding portion of the projection in the protrusion direction thereof (equivalent to the transverse direction of the projection), it is possible to compress and reduce the size of the main protruding portion and also the auxiliary protruding portion in the transverse direction.

Therefore, with the above-described pushing operation, the combined dimension of the main protruding portion and the auxiliary protruding portion in the transverse direction can be made less than the width of the fitting groove, and the annular main body portion in the projection location can be very easily inserted into and disposed in the fitting groove. Furthermore, by releasing the pressure in the projection location, the auxiliary protruding portion that has been compressed and reduced in size in the transverse direction is restored to the original size and the annular main body portion and the auxiliary protruding portion are mounted under an adequate pressure. In addition to this configuration, where the internal formation region of the auxiliary protruding portion and the annular main body portion has a width at least equal to or larger than the width of the fitting groove, the packing material can be strongly mounted on the fitting groove via a pressing force. As a result, in the projection formation location of the packing material, the auxiliary protruding portion together with the annular main body portion can apply an adequate pushing force from both groove wall portions of the fitting groove, and even when a strong impact occurs in the process of transporting the casing with the packing material mounted thereon as a part to a site of the next process, the annular main body portion cannot easily rise from the fitting groove and a packing material fitting structure that excels in impact resistance can be obtained.

As described hereinabove, by applying a pressure to the projection in the transverse direction, the auxiliary protruding portion can be reduced in size in the transverse direction. Therefore, the annular main body portion and also the auxiliary protruding portion can be pressed to the bottom portion location of the fitting groove, the annular main body portion and the auxiliary protruding portion can be disposed so as to be in reliable contact with the bottom portion, and a stable fitting state can be produced. Furthermore, when the auxiliary protruding portion of the projection is disposed reliably on the groove bottom portion of the fitting groove and the main protruding portion is in a state of incomplete mounting on the cutout portion, the main protruding portions rises from the lower end of the cutout portion, and because the main protruding portions has a shape inclined in the up-down direction, this state can be easily viewed (see FIG. 6D).

As a result, incomplete mounting of the main protruding portion on the cutout portion can be prevented, the occurrence of errors in the mounting operation of the packing material on the fitting groove can be prevented and quality of assembling the packing with the casing can be increased. Furthermore, the main protruding portion of the projection is inserted into the cutout portion, the auxiliary protruding portion is inserted together with annular main body portion into the fitting groove, and the main protruding portion is prevented from separating from the cutout portion by a counterforce (elastic pushing force) received by the auxiliary protruding portion from the fitting groove. In addition, because the cross-sectional form of the fitting groove is such that the groove width decreases gradually in the direction toward the groove bottom portion due to a draft angle, the auxiliary protruding portion and the annular main body portion are reliably disposed on the groove bottom portion of the fitting groove, thereby further increasing a force pushing the annular main body portion and the auxiliary protruding portion in the transverse direction. As a result, the packing material can be in a state in which it is even more difficult for the packing material to separate from the fitting groove.

According to second aspect of the invention, the auxiliary protruding portion of the projection is formed at both sides in the longitudinal direction of the main protruding portions. As a result, in a state in which the main protruding portion has been inserted into the cutout portion, the auxiliary protruding portions are brought into contact with a wall surface of the fitting groove by an adequate pressure at both sides in the transverse direction of the opening of the cutout portion, and the projection location is mounted on the fitting groove in a very stable balanced state. According to third aspect of the invention, the thickness of the auxiliary protruding portion is smaller than the thickness of the main protruding portion. As a result, the auxiliary protruding portion can be easily pushed into the fitting groove.

According to forth aspect of the invention, the position of the lower surface side of the auxiliary protruding portion substantially coincides with the lower end of the annular main body portion in the diametrical direction. As a result, the auxiliary protruding portion can be reliably disposed at the groove bottom portion of the fitting groove and the packing material can be more reliably mounted on the fitting groove. According to fifth aspect of the invention, because of the fitting structure of a packing material in which the front surface of the auxiliary protruding portion is formed with an inclination such as to approach the annular main body portion side with the transition from the upper surface to the lower surface, the front surface and lower surface of the auxiliary protruding portion can be brought into reliable contact with both groove wall portions and groove bottom portion of the fitting groove provided with a draft angle, and the packing material can be very effectively mounted on the fitting groove.

DESCRIPTION OF THE PREFERRED EMBODIMENTS

Figure 1A:
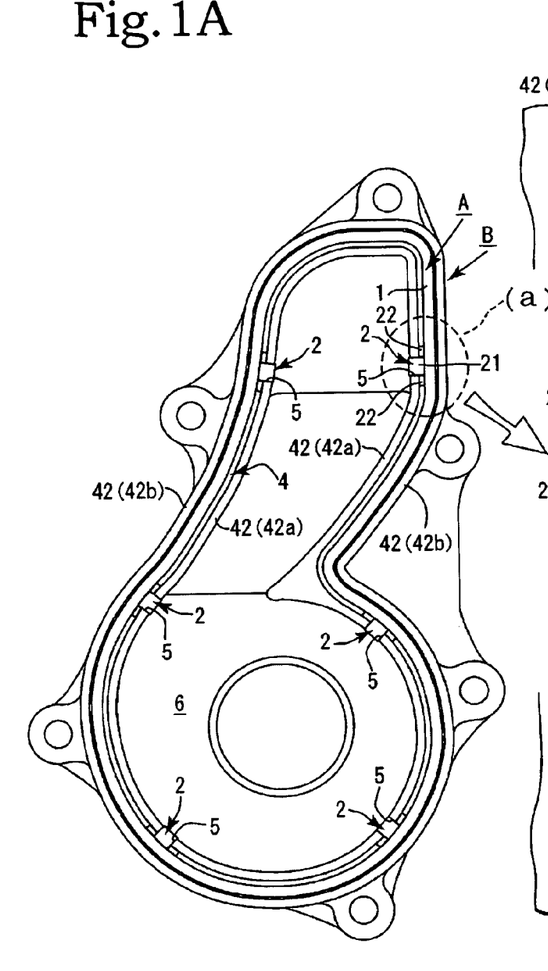
FIG. 1A is a plan view illustrating a state in which a packing material is mounted on a casing.
Figure 1B:
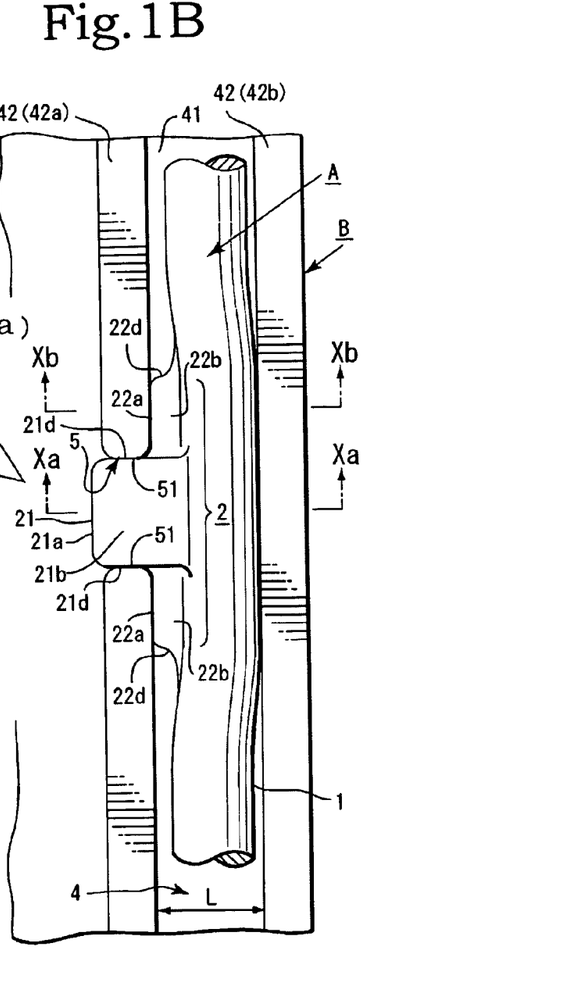
FIG. 1B is an enlarged view of portion (a) in FIG. 1A.
Figure 1C:
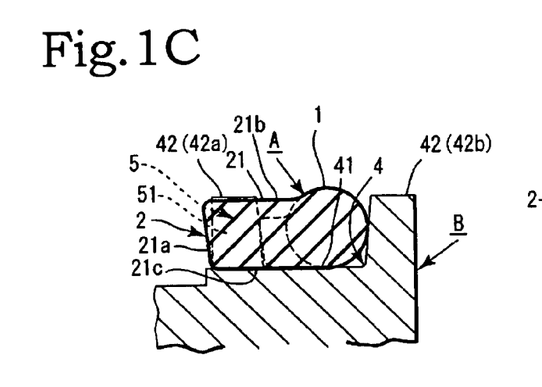
FIG. 1C is a cross-sectional view along the Xa-Xa line in FIG. 1B.
Figure 1D:
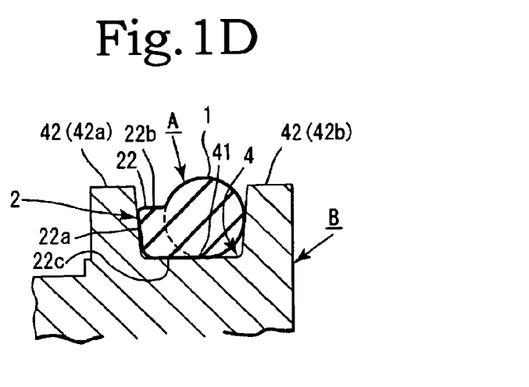
FIG. 1D is a cross-sectional view along the Xb-Xb line in FIG. 1B.
Figures 2A, 2B, 2C, 2D, 2E:
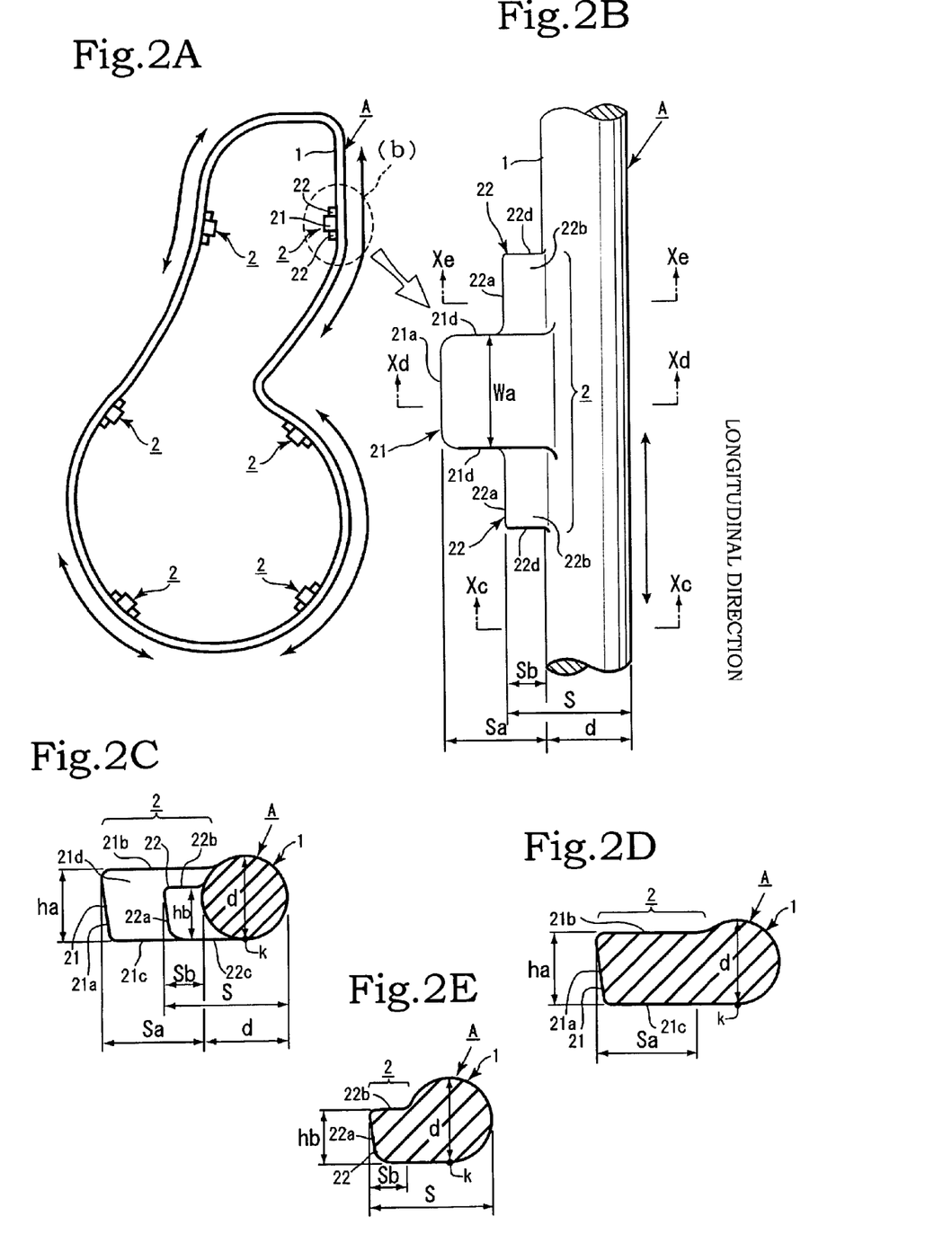
FIG. 2A is a plan view of the packing material.
FIG. 2B is an enlarged view of portion (b) in FIG. 2A.
FIG. 2C is a cross-sectional view along the Xc-Xc line in FIG. 2B.
FIG. 2D is a cross-sectional view along the Xd-Xd line in FIG. 2B.
FIG. 2E is a cross-sectional view along the Xe-Xe line in FIG. 2B.

An embodiment of the present invention will be described below with reference to the appended drawings. As shown in FIG. 1 and FIG. 2, a packing material A is composed of an annular main body portion 1 and a plurality of projections 2, 2, . . . . The plurality of projections 2, 2, . . . are formed with an appropriate spacing along the longitudinal direction of the annular main body portion 1. The longitudinal direction of the annular main body portion 1 is the same direction as the circumferential direction of the annular main body portion 1. The longitudinal direction of the annular main body portion 1 is along the circumference of the annular main body portion 1 (see FIG. 2A). As shown in FIG. 2A, the annular main body portion 1 has an endless annular (loop) shape and is formed to have a shape substantially identical to the shape in the longitudinal direction of a fitting groove 4 of the below-described casing B. The annular main body portion has a definite shape such as a round shape or a rectangular shape only in few sections thereof and mostly has a shape following the shape of the fitting groove 4 of the below-described casing B, as shown in FIG. 1A.

A cross-sectional shape perpendicular to the longitudinal direction of the annular main body portion 1 is a circular shape having elasticity in the radial direction. The projections 2, 2, . . . are not necessarily formed equidistantly with respect to the annular main body portion 1. They rather correspond to the formation positions of notched portions 5, 5, . . . formed in the fitting groove 4 of the below-described casing B (see FIG. 1A, FIG. 2A, and FIG. 3A). As shown in FIG. 1 and FIG. 2, the projection 2 is configured by a main protruding portion 21 and an auxiliary protruding portion 22. As shown in FIGS. 2A and 2B and FIG. 4, the longitudinal direction of the projection 2 is identical to the longitudinal direction of the annular main body portion 1, and the transverse direction of the projection 2 is perpendicular to the longitudinal direction of the annular main body portion 1.

Figure 4A:
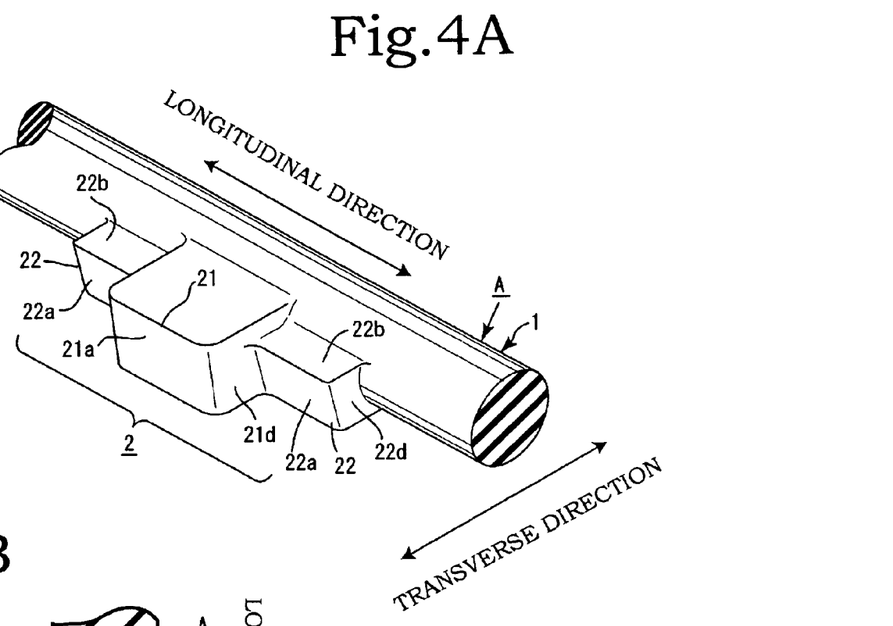
FIG. 4A is an enlarged perspective view in the vicinity of the projection of the packing material.

As shown in FIG. 4A, the main protruding portion 21 is formed in a substantially rectangular parallelepiped shape so as to protrude in the direction perpendicular (also includes substantially perpendicular) to the longitudinal direction of the annular main body portion 1. A front surface 21a, an upper surface 21b, a lower surface 21c, and two opposing side surfaces 21d, 21d are present in the main protruding portion (see FIG. 2 and FIG. 4). The front portion 21a is parallel to the longitudinal direction of the annular main body portion 1, and the side surfaces 21d are perpendicular to the longitudinal direction of the annular main body portion 1. More specifically, in a state in which the annular main body portion 1 is disposed on a horizontal plane, the main protruding portion 21 protrudes in the horizontal direction (also includes substantially horizontal direction).

The distance between the lower surface 21c and the upper surface 21b of the main protruding portion 21, that is, a thickness dimension ha, is formed to be slightly less than a diameter d of a circular cross-sectional shape of the annular main body portion 1 (see FIG. 2C). Alternatively, the thickness dimension ha of the main protruding portion 21 is substantially equal to the diameter d of the circular cross section of the annular main body portion 1. Furthermore, a position of the main surface 21c of the main protruding portion 21 and a lower end position k of the annular main body portion 1 in the direction of the diameter d substantially coincide on the same plane (see FIGS. 2C and 2D). Alternatively, the position of the lower surface 21c of the main protruding portion 21 can be slightly higher than the position of the lower end of the annular main body portion 1 in the direction of diameter d. Furthermore, the front surface 21a may be also formed to incline inwardly (toward the annular main body portion 1) in the downward direction from the upper surface 21b to the lower surface 21c (see FIGS. 2C and 2D).

As shown in FIG. 2B and FIG. 4A, the auxiliary protruding portion 22 is formed integrally with the main protruding portion 21 and the annular main body portion 1 in the vicinity of the main protruding portion 21, and the auxiliary protruding portions 22 are formed on both sides in the longitudinal direction of the main protruding portion 21. The longitudinal direction of the main protruding portion 21 is a direction that coincides with the longitudinal direction of the annular main body portion 1 and perpendicular the transverse direction of the main protruding portion 21 (see FIGS. 2A and 2B and FIG. 4A). As shown in FIG. 4A, the auxiliary protruding portion 22 is formed in a substantially rectangular parallelepiped shape and, similarly to the main protruding portion 21, has a front surface 22a, an upper surface 22b, a lower surface 22c, and a side surface 22d. The auxiliary protruding portion 22 is formed to protrude in the longitudinal direction (identical to the longitudinal direction of the annular main body portion 1) of the main protruding portion 21 from each side surface 21d of the main protruding portion 21. Therefore, the side surface 22d of the auxiliary protruding portion 22 is present only on one side.

As for the protrusion amount of the main protruding portion 21 and the auxiliary protruding portion 22 in the direction perpendicular to the longitudinal direction of the annular main body portion 1 in the integral formation zone of the projection 2 and the annular main body portion 1, a protrusion amount sb of the auxiliary protruding portion 22 is less than a protrusion amount sa of the main protruding portion 21 (see FIGS. 2B to 2E and FIG. 4A). That is, sb<sa. Furthermore, the distance between the lower surface 22c and the upper surface 22b of the auxiliary protruding portion 22, that is, a thickness dimension hb of the auxiliary protruding portion 22 is less than the thickness dimension ha of the main protruding portion 21 (see FIGS. 2B to 2E). Alternatively, the thickness dimension hb of the auxiliary protruding portion 22 is substantially equal to the thickness dimension ha of the main protruding portion 21.

Thus, the diameter d of the circular cross section of the annular main body portion 1, the thickness dimension ha of the main protruding portion 21, and the thickness dimension hb of the auxiliary protruding portion 22 satisfy the following relationship: (diameter d)>(thickness dimension ha)>(thickness dimension hb). Alternatively, the following relationship can be satisfied: (diameter d)=(thickness dimension ha)=(thickness dimension hb). Furthermore, the front surface 22a of the auxiliary protruding portion 22 is formed to incline downward toward the annular main body portion 1. Since the front surface 22a is thus made as an inclined surface, the front surface 22a and the lower surface 22c of the auxiliary protruding portion 22 can be reliably brought into contact with both groove wall portions 42, 42 and a groove bottom portion 41 of the fitting groove 4 provided with a draft angle and the packing material A can be very advantageously mounted on the fitting groove 4. Furthermore, the position of the lower surface 22c of the auxiliary protruding portion 22 coincides on a substantially identical plane with the lower surface 21c of the main protruding portion 21 and the lower end position k of the diameter d in the vertical direction of the annular main body portion 1 (see FIG. 2C). Similarly to the usual O-ring, the packing material A is from a rubber or a synthetic resin and inherently has elasticity.

A sum total of the protrusion amount sb of the auxiliary protruding portion 22 from the annular main body portion 1 in the above-described integral formation zone of the annular main body portion 1 and the auxiliary protruding portion 22 and the diameter d of the annular main body portion 1 is taken as a total transverse dimension S. The total transverse dimension S is at least equal to a groove width L of the fitting groove 4, and it is more preferred than the total transverse dimension S be larger than the groove width L (see FIGS. 5A and 5D). Thus, (total transverse dimension S)≧(groove width L). Furthermore, due to its own elastic deformation, the auxiliary protruding portion 22 receives a pressure force (counterforce) Fb from the groove wall portion 42 on one side of the fitting groove 4 and is fixed inside the fitting groove 4 by this counterforce (see FIGS. 5C and 5E).

Figure 4B:
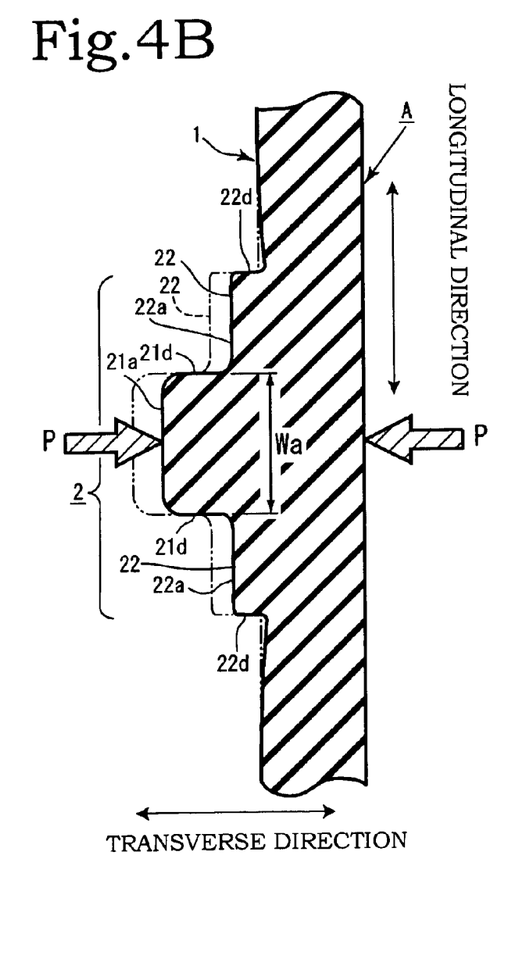
FIG. 4B is an enlarged plan view in the vicinity of the projection in a state in which elastic deformation is caused by application of an external force in the transverse direction of the projection.
Figure 4C:
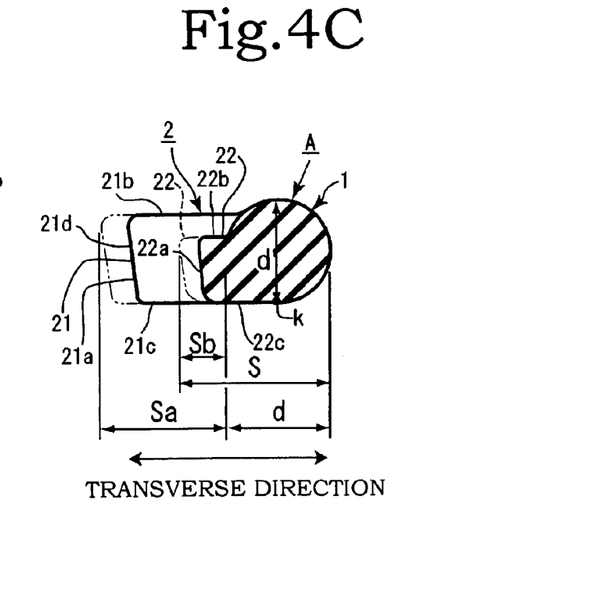
FIG. 4C is an enlarged vertical sectional view in the vicinity of the projection in a state in which elastic deformation is caused by application of an external force in the transverse direction of the projection.

By applying an external force so as to press the main protruding portion 21 of the projection 2 in the transverse direction, the main protruding portion 21 and also the auxiliary protruding portions 22, which is formed integrally with the main protruding portion 21 and follows the deformation for the main protruding portion 21, are compressed, contracted, and reduced in size in the transverse direction (see FIGS. 4B and 4C). This pressing operation can be performed very easily by pinching the annular main body portion 1 and the main protruding portion 21 in the location of the projection 2 between two fingers of a hand and applying pressure so as to crush the main protruding portion 21 and the annular main body portion 1.

Figure 6A:
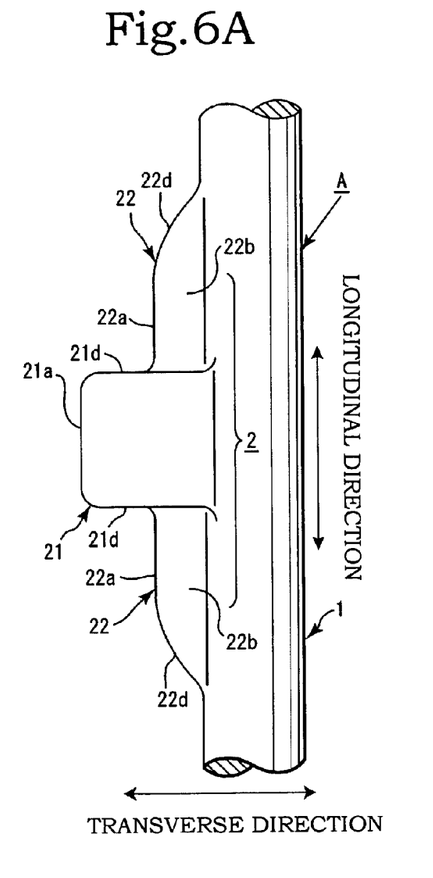
FIG. 6A is a principal enlarged plan view illustrating the first modification example of the projection.
Figure 6B:
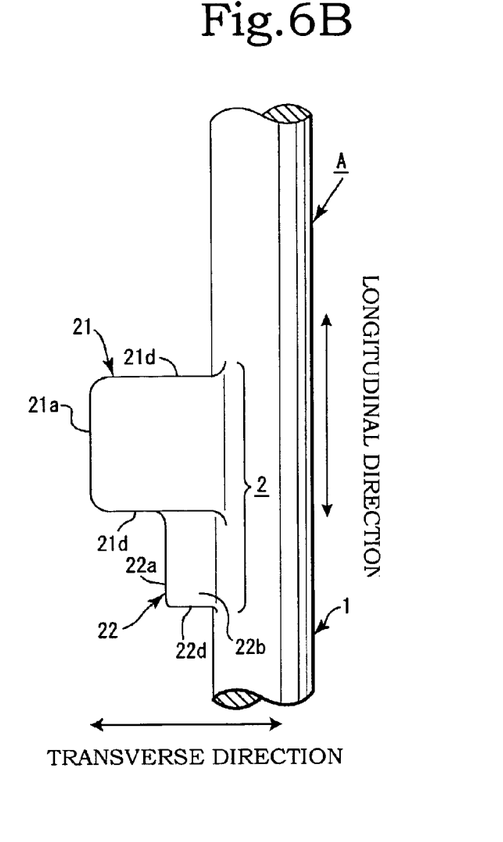
FIG. 6B is a principal enlarged plan view illustrating the second modification example of the projection.
Figure 6C:
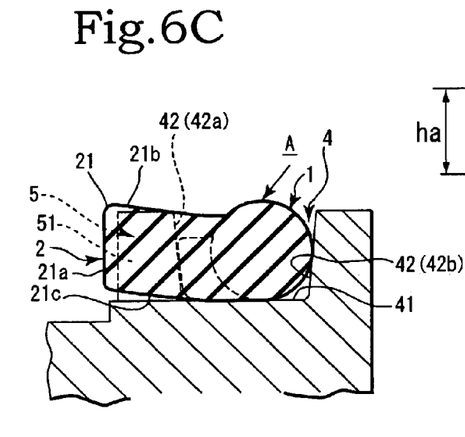
FIG. 6C is a principal enlarged plan view of the packing material in which a height dimension of the auxiliary protruding portion is brought close to the height dimension of the main protruding portion.
Figure 6D:
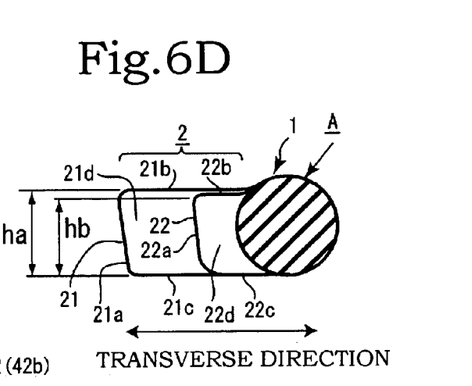
FIG. 6D is a principal enlarged plan view illustrating the state in which the incomplete mounting state of the main protruding portion to the cutout portion can be easily viewed.

The side surface 22d of the auxiliary protruding portion 22 is usually formed to be substantially perpendicular to the longitudinal direction of the annular main body portion 1, but it can be also formed to have a slight slope such that the protrusion amount decreases gradually along the longitudinal direction of the annular main body portion 1 (see FIG. 6A). Furthermore, as described above, the auxiliary protruding portion 22 of the projection 2 is formed at both sides in the longitudinal direction of the main protruding portion 21, but the auxiliary protruding portion 22 can be also formed only on one side in the longitudinal direction of the main protruding portion 21 (see FIG. 6B).

The casing B will be described below. The casing B is, for example, a case of a water pump for cooling the engine and is a structural member constituting part of the engine. Furthermore, a volute chamber constituting a water pump can be also formed in the engine body. The casing B can be also used as a cover member of a water pump, and the packing material A is inserted between the joining surfaces in locations where hermetic sealing and water tightness are required. In the description of the present invention, a water pump will be explained as a specific example. A bearing of a drive shaft having an impeller mounted thereon is incorporated in the casing B, and a belt wheel is provided outside the casing B on the drive shaft.

As shown in FIG. 3, an annular (loop-shaped) fitting groove 4 is formed in an outer circumferential portion of the casing B, and the annular main body portion 1 of the packing material A is mounted on the fitting groove 4. The fitting groove 4 is formed as a circumferential path (annular groove course or route), but only few sections thereof have a regular shape such as a circular shape or a rectangular shape. As shown in FIG. 3A, the fitting groove has a shape corresponding to the outer circumferential shape of the casing B, more specifically, to the outer circumferential shape of a pump chamber 6 located inside the pump. As a result, the fitting groove is mostly a circumferential path having an irregular groove (loop-like) shape.

Furthermore, in the fitting groove 4, groove wall portions 42, 42 are formed at both sides in the transverse direction of the groove bottom portion 41 that has a substantially flat cross section (see FIGS. 3A to 3C and FIG. 3E). Both groove wall portions 42, 42 are formed as standing rising walls on the groove bottom portion 41. One groove wall portion 42 is in the form of a rising wall plate partitioning the inside of the casing B, that is, the pump chamber 6, and this groove wall portion is called an inner circumferential groove wall portion 42a. The other groove wall portion 42 is in the form of a rising wall or rising plate partitioning the outside of the casing portion B. This groove wall portion is called an outer circumferential groove wall portion 42b.

Both groove wall portions 42, 42 are usually provided with a draft angle in the process of manufacturing the casing B by casting and formed as inclined groove wall portions 42, 42 so that the groove width decreases as the groove depth increases, that is, as the groove bottom portion 41 is approached. In this case, the groove width L is a width of the groove bottom portion 41 and a minimum-width portion of the fitting groove 4 (see FIGS. 3C and 3D). Furthermore, in the fitting groove 4, both groove wall portions 42, 42 can be parallel each other and face each other and can have a uniform width in the depth direction thereof.

As described hereinabove, the shape of the packing material A in the longitudinal direction is configured as a shape substantially identical to the shape of the entire circumferential path of the fitting groove 4. The groove length L in the location of the groove bottom portion 41 in the entire fitting groove 4 is formed to be larger than the diameter d of the annular main body portion 1 of the packing material A. Furthermore, the depth dimension of the fitting groove 4 is formed to be smaller than the diameter d of the annular main body portion 1 of the packing material A, and the packing material A projects from the surface of the fitting groove 4 in the depth direction (see FIGS. 1C and 1D).

Figure 3A:
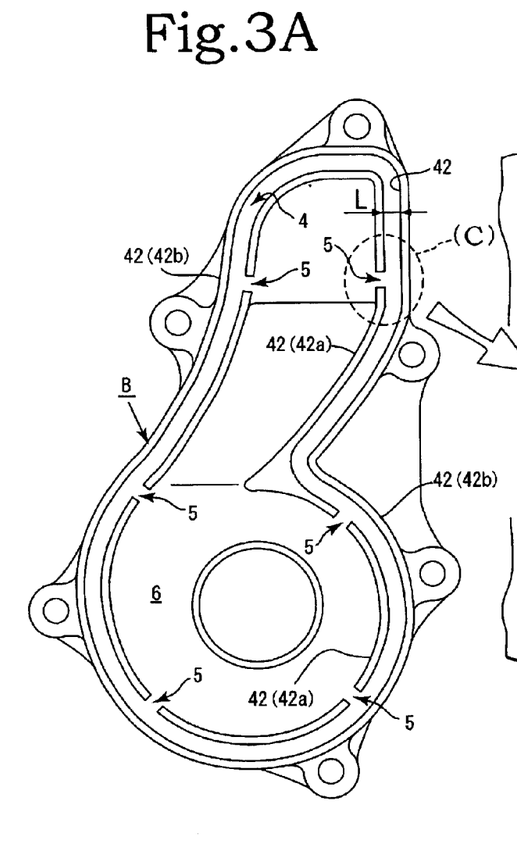
FIG. 3A is a plan view of the casing.

Cutout portions 5, 5, . . . are formed with an appropriate spacing in the circumferential path (groove course) direction of the fitting groove 4 (see FIG. 3A). The cutout portion 5 in either the inner circumferential groove wall portion 42a or the outer circumferential groove wall portion 42b of the fitting groove 4. The main protruding portion 21 of the projection 2 of the packing material A is inserted and disposed in the cutout portion 5 (see FIG. 1). The main protruding portion 21 is fixed to the cutout portion 5 by generating a mutually appropriate pushing force (counterforce) Fa between the main protruding portion and the cutout portion 5 (see FIGS. 5D and 5E). The cutout portion 5 is formed by cutting out an appropriate regional portion of the groove wall portion 42 (inner circumferential groove wall portion 42a or outer circumferential groove wall portion 42b) and forming an opening. This opening is formed in a substantially rectangular shape (see FIG. 3E).

Where the cutout portion 5 is formed in the side of the outer circumferential groove wall portion 42b of the fitting groove 4, when the packing material A is mounted on the fitting groove 4, the main protruding portion 21 of the projection 2 can be easily inserted into the cutout portion 5. This is because when the cutout portion 5 is formed in the side of the outer circumferential groove wall portion 42b, the outward side of the cutout portion 5 is also outward the casing B, and practically no obstacle interfering with the insertion of the projection 2 into the cutout portion 5 is present.

For this reason, the main protruding portion 21 of the projection 2 is easily introduced into the cutout portion 5 and sufficiently cut into it, the packing material A can be reliably mounted on the fitting groove 4, and the operability of attachment can be further improved. Furthermore, because the insertion of the main protruding portion 21 of the projection 2 inserted into the cutout portion 5 from the outside of the casing B can be verified, it is possible to verify whether the packing material A has been mounted, without disassembling the casing B.

Figure 3B:
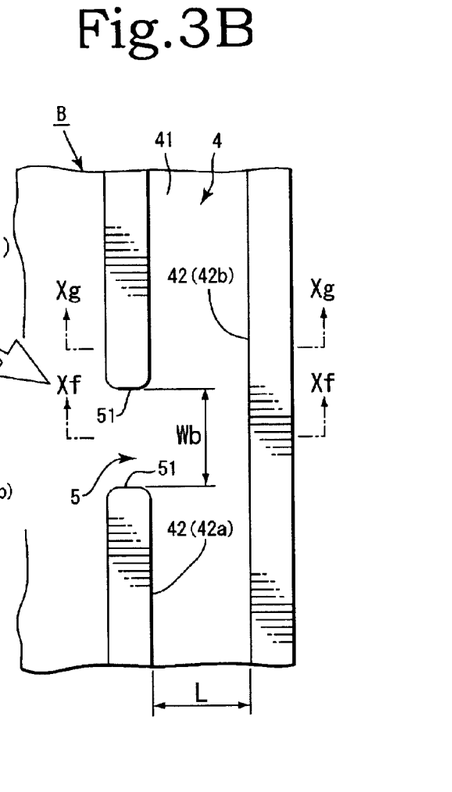
FIG. 3B is an enlarged view of portion (c) in FIG. 3A.
Figure 3C:
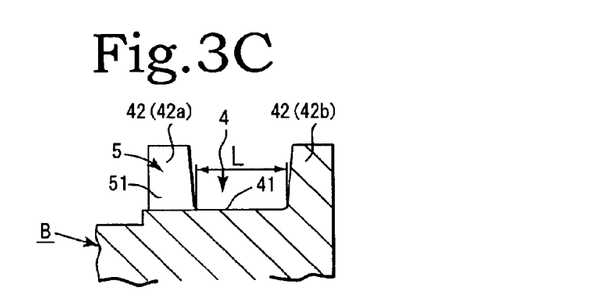
FIG. 3C is a cross-sectional view along the Xf-Xf line in FIG. 3B.
Figure 3D:
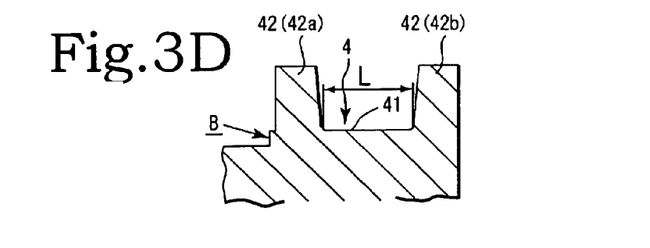
FIG. 3D is a cross-sectional view along the Xg-Xg line in FIG. 3B.
Figure 3E:
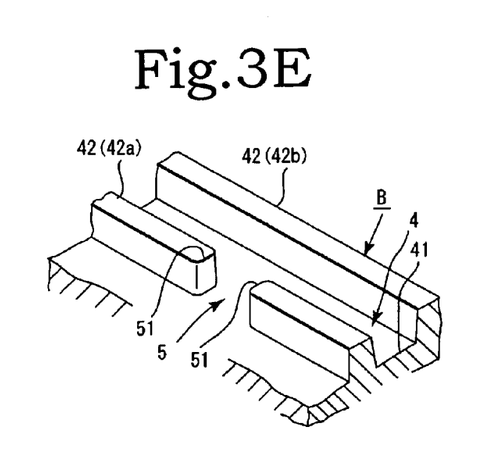
FIG. 3E is an enlarged perspective view in the vicinity of a cutout portion.

Furthermore, a lower end of the cutout portion 5 is formed to be flush with the groove bottom portion 41 of the fitting groove 4. Alternatively, the lower end of the cutout portion 5 can be formed in a position slightly higher than the groove bottom portion 41. As shown in FIGS. 3A, 3B, and 3E, the cutout portion 5 has two notch edges 51, 51. Thus, an opening is formed between the two notch edges 51, 51, and the main protruding portion 21 of the projection 2 is disposed and fixed by sandwiching between the two notch edges 51, 51. As described hereinabove, all the cutout portions 5, 5, . . . are formed in either of the inner circumferential groove wall portion 42a and the outer circumferential groove wall portion 42b of the fitting groove 4.

In order to fix the main protruding portion 21 of the projection 2 of the packing material A to the cutout portion of the casing B, a spacing dimension Wa of the two side surfaces 21d, 21d of each main protruding portion 21 has to be formed equal to a spacing dimension Wb of the two notch edges 51, 51 of the cutout portion 5, or the spacing dimension of the two side surfaces 21d, 21d has to be formed larger than the spacing dimension Wb of the two notch edges 51, 51 of the cutout portion 5. Thus, Wa≧Wb.

Figure 5A:
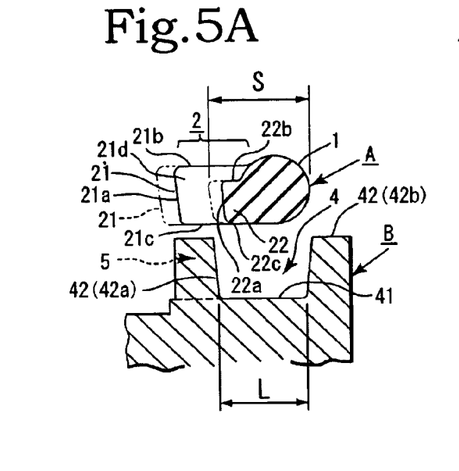
FIG. 5A is an enlarged vertical sectional view illustrating compression in the transverse direction of the projection performed for mounting on the fitting groove.
Figure 5B:
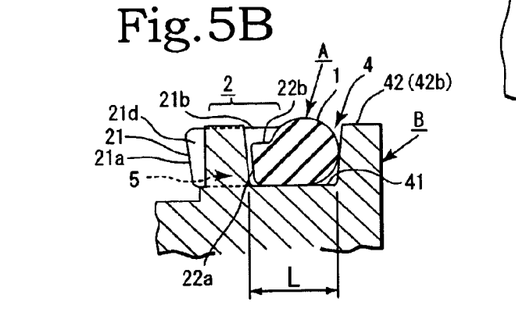
FIG. 5B is an enlarged vertical sectional view illustrating a state in which insertion into and disposition in the fitting groove is performed while compressing in the transverse direction of the projection.
Figure 5C:
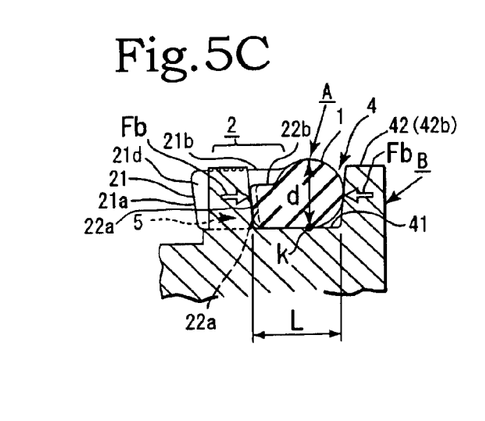
FIG. 5C is an enlarged vertical sectional view illustrating a state in which an external force is released from the projection and the state inside the fitting groove is restored.

Further, in order to mount the packing material A on the fitting groove 4 of the casing B, the position of each portion of the packing material A is aligned according to the shape of the fitting groove 4, the packing material A is disposed in the fitting groove 4, the auxiliary protruding portion 22 and the annular main body portion 1 are inserted into the fitting groove 4, while the main protruding portion 21 of the projection 2 and the annular main body portion 1 are being pressed from the transverse direction and compressed, and the main protruding portion 21 is inserted into and disposed in the cutout portion 5 (see FIGS. 5A to 5C). In this case, each projection 2 of the packing material A assumes a state in which it is substantially fitted into the cutout portion 5, that is, a fitted state, and each projection is sandwiched by the two notch edges 51, 51 of the cutout portion 5 and elastically compressed in the longitudinal direction of the projection 2.

Figure 5D:
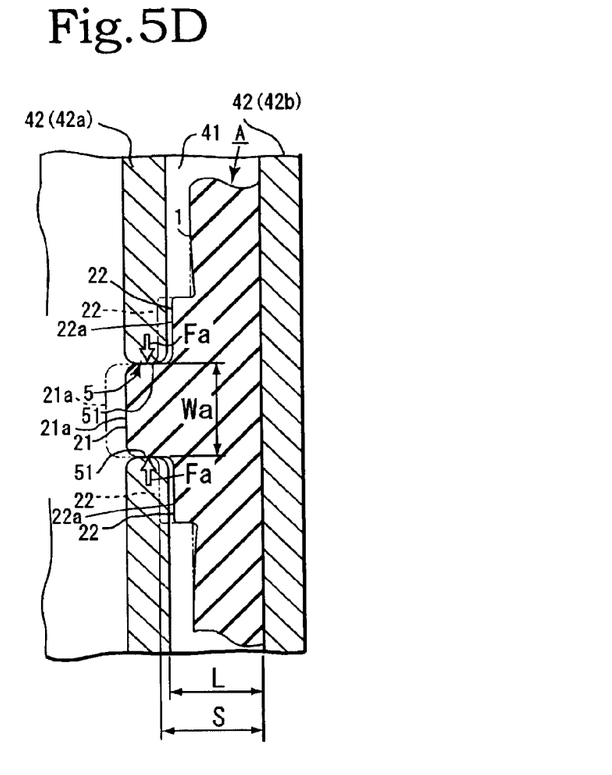
FIG. 5D is an enlarged vertical sectional view illustrating a state in which insertion into and disposition in the fitting groove is performed, while causing compression in the transverse direction of the projection.
Figure 5E:
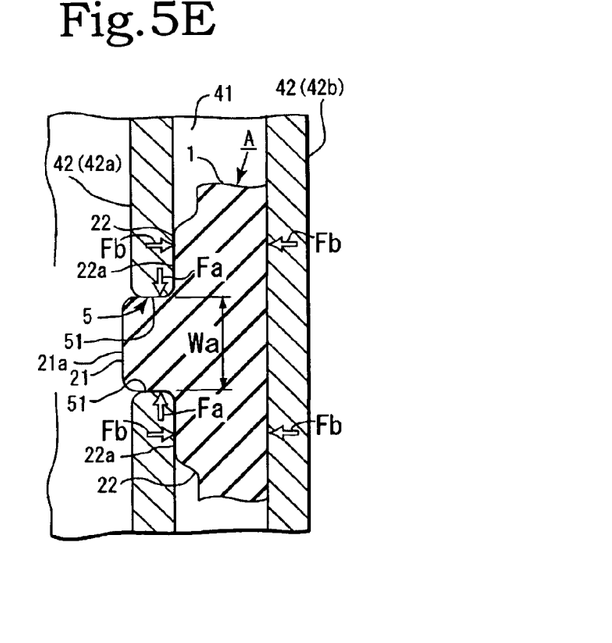
FIG. 5E is an enlarged vertical sectional view illustrating a state in which an external force is released from the projection and the state inside the fitting groove is restored.

As a result, a pushing force (counterforce) Fa produced by elasticity is generated between the projection 2 and the cutout portion 5, the projection 2 is fixed to the cutout portion 5, and the packing material A is mounted in a fixed state on the fitting groove 4 of the casing B (see FIGS. 5D and 5E). Thus, it is possible to prevent the decrease in operation efficiency caused by the packing material A dropping out of the casing B, the packing material A being lost, and the packing material A being separated in the assembling operation in the process of producing the part at a site and then transporting to another site, for example, in the process of handling and transporting before fitting in a large structural object such as an engine.

Projections 2, 2, . . . of the packing material A are formed either on the inner side or on the outer side, but such a configuration is not limiting, and the formation locations of the projections 2, 2, . . . can be present on both the inner side and the outer side in a mixed fashion. In this case, the formation locations of cutout portions 5, 5 . . . on the side of the casing B are also formed respectively on the inner circumferential groove wall portion 42a and outer circumferential groove wall portion 42b of the fitting groove 4 in a mixed fashion. In this case, the formation positions of the projections 2, 2, . . . and the cutout portions 5, 5, . . . obviously correspond to each other.

In accordance with the present invention, with the above-described configuration, the auxiliary protruding portion 22 and the annular main body portion 1 are inserted into both groove wall portions 42, 42 of the fitting groove 4 and fixed inside the fitting groove 4 in the transverse direction of the auxiliary protruding portion 22 and the annular main body portion 1, and also the main protruding portion 21 is inserted and fitted in the cutout portion 5. As for fixing the main protruding portions 21 with the cutout portion 5, because the auxiliary protruding portion 22 and the annular main body portion 1 are inserted into the fitting groove 4, a pressure force (counterforce) Fb is generated that is received by the total width dimension S of the auxiliary protruding portion 22 and the annular main body portion 1 from the groove width L of the two groove wall portions 42, 42, and this pressure force Fb enables even stronger mounting of the packing material A on the fitting groove 4 (see FIGS. 5C and 5E). Furthermore, the force Fb received by the auxiliary protruding portion 22 from the groove width L is set smaller than the pressure force Fa received by the main protruding portions 21 from the cutout portion 5, that is, pressure force Fb<pressure force Fa. Because a low pressure force Fb is thus set, the directions of the pressure force Fa and pressure force Fb become orthogonal, while the mounting load of the packing material A is suppressed. As a result, the packing material A can be fixed even stronger to the fitting groove 4 (see FIG. 5E).

By applying an external force so as to press the main protruding portions 21 and the annular main body portion 1 in the transverse direction, the auxiliary protruding portion 22 formed integrally with the main protruding portions 21 is compressed and contracted in the transverse direction and the size thereof in the transverse direction is reduced (see FIGS. 4B and 4C). This pressing operation can be performed very easily by pinching the annular main body portion 1 and the main protruding portion 21 in the location of the projection 2 between two fingers of a hand and applying a pressure so as to compress the main protruding portion 21 and the annular main body portion 1.

The combined size of the annular main body portion 1 and the auxiliary protruding portion 22 in the transverse direction can thus be made smaller than the width of the fitting groove 4, and the annular main body portion 1 in the location of projection 2 can be very easily inserted into and mounted on the fitting groove 4 (see FIGS. 5A, 5B, and 5D). Furthermore, by releasing the pressure in the location of projection 2, the auxiliary protruding portion 22 that has been compressed and reduced in size in the transverse direction returns to the original shape and the annular main body portion 1 and the auxiliary protruding portion 22 are mounted by an adequate pressure on the fitting groove 4 (see FIGS. 5C and 5E).

This mounting operation can be performed very easily, and the packing material A can be mounted comparatively strongly on the casing B by fixing with a plurality of projections 2, 2, . . . and cutout portions 5, 5, . . . . As a result, the packing material A can be prevented from easily dropping out from the casing B in the course of handling and transporting from a production site to a separate assembling site and during the assembling operation. Furthermore, in accordance with the present invention, when the auxiliary protruding portion 22 of the projection 2 is reliably disposed at the groove bottom portion 41 of the fitting groove 4 and also when the main protruding portion 21 is in an incomplete mounting state on the cutout portion 5, the main protruding portion 21 assumes a state in which it rises from the lower end of the cutout portion 5 and the main protruding portion 21 becomes inclined in the up-down direction along the transverse direction. Such a state of incomplete mounting of the main protruding portion 21 on the cutout portion 5 can be easily seen because, when the main protruding portion 21 is tilted as described hereinabove, the main protruding portion 21 visibly rises from the cutout portion 5. Therefore, the operation of assembling the packing material A with the fitting groove 4 can be efficiently inspected (see FIG. 6D).

Furthermore, the projections 2, 2, . . . are formed to protrude on the inner side of the packing material A and the cutout portions 5, 5, . . . are formed at the inner circumferential groove wall portion 42a of the fitting groove 4. As a result, the casing B can be formed without special increase in size. Thus, because the projections 2, 2, . . . of the packing material A are formed inwardly and these projections 2, 2, . . . are disposed in cutout portions 5, 5, . . . formed at the inner circumferential groove wall portion 42a of the fitting groove 4, the size of the fitting groove 4 can be set appropriately with respect to the size of the packing material A, without enlarging the outer circumferential groove wall portion 42b of the fitting groove 4 in the outward direction (without enlarging the groove width L). As a result, sufficient fitting can be ensured within the conventional fitting space, without enlarging the casing B, and such a configuration is especially useful for a water pump mounted on an engine of an automobile or the like where the fitting space is limited.

What is claimed is:

1. A packing material fitting assembly, comprising:
a packing material having an annular main body portion and a plurality of projections each comprising a main protruding portion formed to protrude from the annular main body portion and an auxiliary protruding portion formed integrally in the vicinity of the main protruding portion, the projections being spaced in the longitudinal direction of the annular main body portion; and
a casing having formed therein an annular fitting groove for inserting therein the annular main body portion of the packing material,
wherein a cutout portion into which only the main protruding portion of the projection is inserted is formed in a first of a plurality of groove wall portions of the fitting groove, an integral forming region of the auxiliary protruding portion and the annular main body portion has a width substantially equal to or larger than a width of the fitting groove, and in the packing material, a projection formation location is pressed and fixed only by the cutout portion and the groove wall portions in the vicinity of the cutout portion,
wherein a thickness, which comprises a distance between a lower surface and an upper surface of the auxiliary protruding portion, is formed to be smaller than a thickness, which comprises a distance between a lower surface and an upper surface of the main protruding portion,
wherein positions of the lower surface of the main protruding portion and the lower surface of the auxiliary protruding portion substantially coincide with a lower end of the annular main body portion in a diametrical direction, and
wherein a front surface of the auxiliary protruding portion is formed to incline so as to approach the annular main body portion in a width direction from an upper surface toward the lower surface of the annular main body portion.

2. The packing material fitting structure according to claim 1, wherein the auxiliary protruding portion of the projection is formed on both sides, in the longitudinal direction, of the main protruding portion.

* * * * *